UNITED STATES PATENT OFFICE.

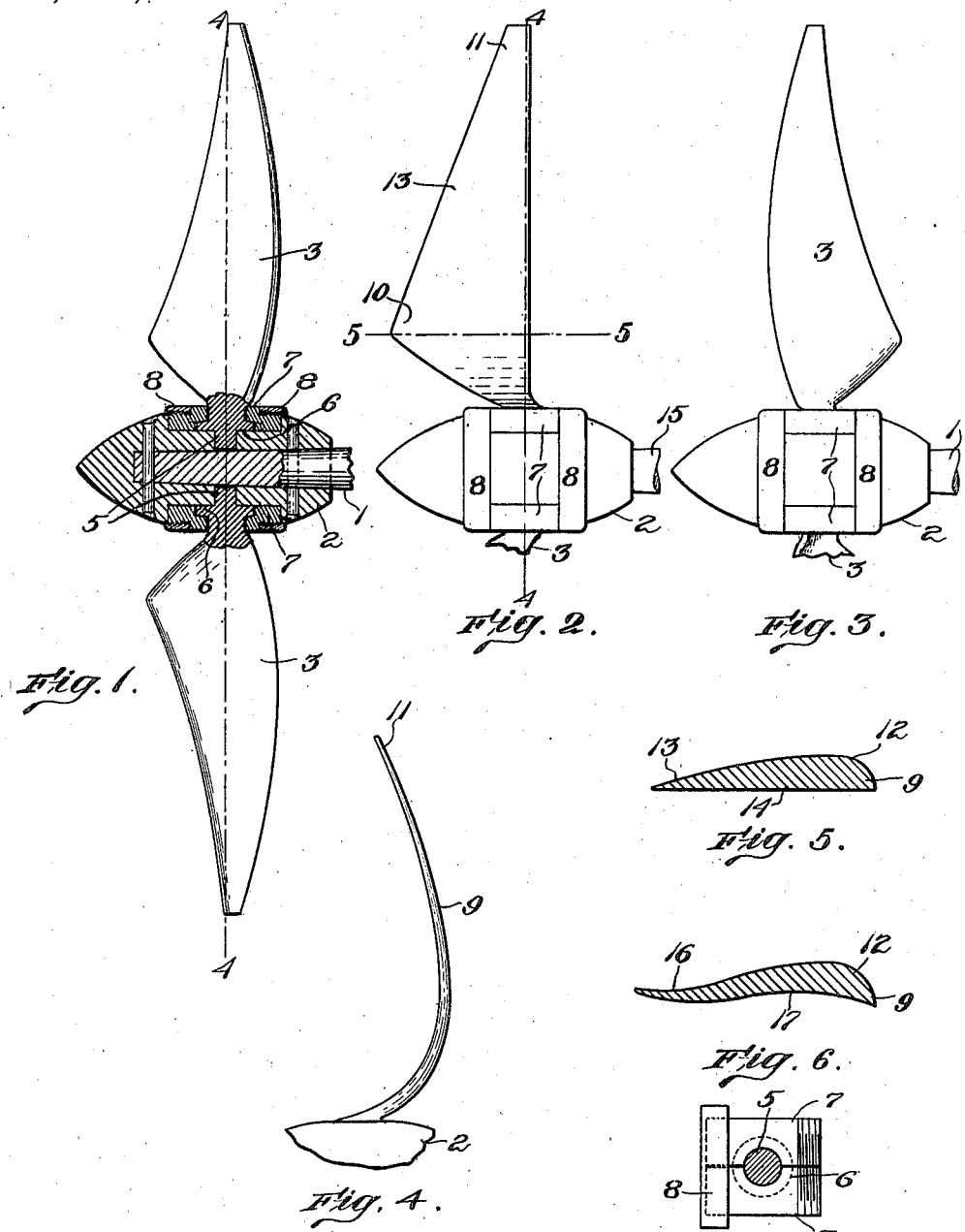

FRANK W. STODDER, OF SOMERVILLE, MASSACHUSETTS.

SELF-ADJUSTING PROPELLER.

1,189,749.      Specification of Letters Patent.      Patented July 4, 1916.

Application filed September 13, 1912. Serial No. 720,211.

*To all whom it may concern:*

Be it known that I, FRANK W. STODDER, a citizen of the United States, and resident of Somerville, county of Middlesex, and State of Massachusetts, have invented an Improvement in Self-Adjusting Propellers, of which the following description, in connection with the accompanying drawings, is a specification, like numerals on the drawings representing like parts.

My invention is a propeller having its blades self-adjusting for varying speeds, being adapted for use either in air or water.

Among the principal objects of my invention, is to provide a propeller which, first, shall maintain at all times the most efficient pitch irrespective of the speed, and second, which shall require a minimum power for driving it.

In carrying out my invention I make the blades of the propeller self-turning and so shape the blades that they will present a constant angle of attack relative to the source of resistance notwithstanding changes of speed or rotation, and hence of forward movement with relation to the air or water. The saving of power in driving the propeller is secured by so shaping and proportioning the blades as to secure a practically uniform thrust at all distances lengthwise of the blade from the shaft. Preferably this is secured by providing a narrow outer end where the speed of travel is greatest and a wider inner end where the speed of travel is less, thereby avoiding the increase friction or drag on the water or air of the usual blade with its wide outer end. By my invention the blades automatically change their pitch with varying speeds, so that there is also an increase in efficiency with an increase of number of revolutions per minute, as distinguished from the operation of propellers having blades with fixed pitches, in which there is a loss of efficiency when the normal speed is exceeded.

I desire to distinguish my invention from those propellers in which the blades are given a limited rotary or pivotal movement with relation to the shaft for the purpose of feathering or being rendered dead (as for use in auxiliary craft) and for hand-control, e. g. to reverse the propeller's direction without reversing the engine, my invention differing radically from all these in that the propeller is automatically adjustable in accordance with its varying speed.

I have illustrated one preferred form of my invention in the accompanying drawings in connection with a two-bladed propeller, although not intended to restrict the invention in any wise to this particular type of propeller of the mechanical embodiment thereof herein disclosed for said purposes of illustration.

In the drawings, Figure 1 shows the propeller in side elevation, parts being broken away and sectioned for clearness of illustration; Figs. 2, 3, and 4 are fragmentary views in side elevation, Fig. 2 showing a blade in neutral position, Fig. 3 showing a blade in reverse position, and Fig. 4 showing a blade in what I term zero position; Fig. 5 is a transverse horizontal sectional view on the line 5—5 Fig. 2; Fig. 6 is a similar sectional view of a modified construction; and Fig. 7 is a top plan of the mounting of one of the blades.

It will be understood that the shaft 1 and hub 2 may be of any usual or preferred shape and material, that herein disclosed being shown for convenience only. The blades 3 are suitably trunnioned in the hub 2 so as to swing or turn freely about an axis 4, and for convenience I have shown each blade as having its trunnion provided with a central pivot stud or gudgeon 5 and a widely extending base or lateral support 6 seated in a correspondingly shaped recess provided in said hub and secured therein by clamping plates or bearings 7 engaged at their opposite ends by threaded ring nuts 8, the relation of the parts being such as to permit a free turning of the blades 3 about the axis 4. Each blade is curved as best shown in Fig. 4, which is an edge view of the blade looking at the cutting edge 9 thereof. When the blade is turned at right angles to the shaft, as shown in Fig. 4, this edge is practically coincident with the plane which includes the longitudinal axis of the shaft 1 and the axis of rotation 4 of the blade. Adjacent its base, the blade widens out rearwardly or has a lateral wing 10. Thence it tapers preferably uniformly, as shown best in Fig. 2, to the outer end 11 which is relatively narrow. Likewise the edge 9 tapers to an approximately thin point at said end 11 as best shown in Fig. 4, and also the blade tapers from a relatively thick cutting edge 9, where the outer surface of said blade has a pronounced arch, as shown at 12, Fig. 5, adjacent said cutting edge, to a thin trailing edge 13. Preferably the inner surface of the blade is perfectly flat, as shown best at 14 Fig. 5. The blades are so proportioned and the taper of the blade from its base outwardly, as shown along the line 13, is such that the width varies in proportion to the distance from the center of the shaft, or, in other words, the width decreases in proportion to the increase in speed of travel as the outer end is approached, so that the narrow outer end is compensated by the increased speed of travel thereof as compared with the wider portion toward the hub and the smaller speed of travel thereof.

In use, let it be supposed that when the shaft begins to rotate, the blade is standing in its neutral position, as shown in Fig. 2. Upon the initial rotary movement of the shaft in contra-clockwise direction the wing 10, and in fact all the surface of the blade which extends rearwardly of the axial line 4, viewing Fig. 2, operates in opposition to the direction of attack of the water (supposing the propeller is being used in water) to swing said blade around toward the position shown in Fig. 4. As, however, the blade is curved, as explained, its curved cutting edge portion quickly swings sufficiently forward of the axial line 4 to move the center of pressure on the blade forward until the blade comes, say, to the position shown in Fig. 1, when the pressure is applied at the point which counterbalances the forward swing. Moreover, as the blade swings forward, the angle of attack decreases, and with this decrease of angle of attack, the center of pressure or effort tends to move forward toward the cutting edge, thus giving additional leverage to the resistance against forward swing. The blades will now be in about the position shown in Fig. 1 and impart advance movement to the propeller. As the advance movement of the propeller through the water increases, the source of resistance comes from a smaller and smaller angle to the propeller shaft, the source of resistance at the start of the revolution of the shaft being ninety degrees thereto. In other words, the blade swivels automatically so as to maintain its designed angle to the source of resistance. When the propeller blade is once in revolution, the angle of attack to the source of resistance is constant, but the pitch of the blades is variable. This angle depends upon the curve given to the blades and their width. With a given width any increase of curve (*i. e.* a curve of shorter radius) gives a greater angle of attack, whereas with a given curve any increase of width of the blades gives a smaller angle of attack. It has been shown by recognized authorities that an angle of about ten degrees is the most efficient in its relation to lift and drift. As shown in Fig. 2, where the blade stands edgewise to the length direction of the shaft, the blade offers an angle of resistance of ninety degrees to rotary movement of the shaft, whereas when the blade is swung around to the position shown in Fig. 4, it may be said to offer the least resistance and its angle of attack is zero (when the blade stands thus at right angles to the shaft). Accordingly I have aimed to so curve and proportion the blade that it will automatically adjust and maintain itself in such a position between these two extreme positions of Fig. 2 and Fig. 4, as to have an angle of attack of approximately ten degrees with relation to the source of resistance. And as the source of resistance varies with the rotation of the propeller blades and the longitudinal movement of the propeller through the water (either forward or backward) it follows that the blade correspondingly turns or swivels on its trunnion bearing in automatically maintaining this angle. As the blade starts, the center of pressure on its surface is back of the axis 4, and hence swings the blade forward as the propeller rotates. With this forward swing, two new conditions arise, viz. the angle of attack decreases (preferably until it reaches the desired ten degrees), and the center of pressure tends to move forward near to the cutting edge, while the curved cutting edge advances to a position farther in front of the axis 4 of the swing of the blade (when viewing the propeller from the side as for instance in Figs. 1 and 2). Thereupon another new condition arises, viz. the source of resistance varies, owing to the backward thrust of the revolving blade, so that instead of coming from an angle of ninety degrees with relation to the shaft (as in Fig. 2) it comes from, say, an angle of forty-five degrees with relation to the shaft (supposing the propeller is anchored and simply the water permitted to move). As, however, the propeller itself moves forward in addition to the rearward movement of the water, there follows a further decrease in the angle of resistance of the water with relation to the shaft, which continues to decrease with the increase of relative speed. To make this clearer, suppose the object carrying the propellers is anchored against forward movement (in effect a fan or blower instead of a propeller) the power depends upon the slip, but in allowing it to assume its intended purpose (forward movement) there is an increase in angle of source of resistance at first, but afterward (with increase in forward speed) a gradual decrease, and the most efficiency is attained with the least slip. The blade maintains automatically its proper propelling angle because of its shape and automatic swiveling, so that, notwithstanding all these changes in surrounding conditions, the propeller blade does not change its angle of attack after getting properly started. The blades will automatically maintain an angle with the shaft of approximately ten degrees less than the angle which the source of resistance bears to the shaft. By having the inner surface of the blade formed from front to rear edge widthwise of the blade in a substantially straight line without any widthwise curve the change of center of pressure over said surface is even or uniform as the blade turns automatically. The relatively thick and arched cutting edge and outer surface coöperate with the rearwardly extended adjacent wing surface to promote a tendency to a vacuum over said outer surface and thereby greatly increase the efficiency of the propeller. By having the widest part of the blade adjacent the base, there is less drag through the water than if the outer end of the blade were wire, and also it is easier to overcome the inertia of the blade.

By reversing the blades end for end, my invention is adaptable as a windmill, in which case the wide portions of the blades come at the outer ends where they have the greatest leverage, the object being the reverse of that of a propeller.

In Fig. 6, I have shown the rear end or edge of the blade as provided at its outer surface with a reverse camber 16 opposite to the arch 12 adjacent the forward edge 9, thereby securing the even change of center of pressure in connection with a cambered inner surface 17 which I have explained as being secured in the preferred construction by the substantially straight widthwise surface 14. This is especially advantageous when the propeller is used in the air.

From the above description, it will be understood that my invention is broadly new in providing means for automatically maintaining the blades at their angle of maximum efficiency irrespective of varying speeds or revolutions per minute, and accordingly the invention may be carried out in a wide variety of mechanical embodiments. As the forward speed of the driven object increases, the center of resistance of each blade shifts so as to turn the blade, thereby accordingly changing its pitch to accommodate itself to the varying resistance, the backward thrust on the forward or cutting edge of the blade, together with the effect of the pressure or resistance upon the wing portion of the blade being sufficient to rotate the blade and its trunnion and thus effect the change of pitch. It will be noted that the center of resistance is normally at one side of the axis of swing, i. e., of the axis of the trunnion, and therefore, as soon as the propeller shaft begins to rotate in the direction of the arrow 15, the blade will immediately swing into its proper pitch for a forward drive. So likewise if the propeller shaft be rotated in an opposite direction, the blades of the propeller will immediately reverse and accomplish the same automatic adjustment for a backward movement, as indicated in Fig. 3.

Having described my invention, what I claim as new and desire to secure by Letters Patent is:

1. A propeller, having each blade freely rotatable independently of the other blades on an axis substantially at right angles to the axis of rotation of the propeller, each blade having a longitudinally curved form and a portion of the propelling face formed eccentric to the axis of rotation of the blade whereby said curved and eccentric form automatically turns the blade upon its axis to maintain it approximately at a uniform angle of efficiency irrespective of varying speeds, the pressure upon the offset curved edge of the blade automatically varying the center of pressure of the propelling face of the blade from its normal center when at rest.

2. A propeller, having its blades pivotally mounted for free and independent swinging movement, said pivotal mounting being on an axis substantially at right angles to the axis of rotation of the propeller, each blade being curved outwardly at one side of the axis of said pivotal movement from its base toward the lengthwise middle of the blade and thence inwardly toward said axis for the remaining length of the blade, whereby the center of pressure of each blade and the forwardly curved edge of each blade are each eccentric to said pivotal axis.

3. A propeller, having its blade pivotally mounted for free and independent swinging movement, each blade being curved outwardly at one side of the axis of said swinging movement from its base toward the lengthwise middle of the blade and thence inwardly toward said axis for the remaining length of the blade and having a greater width adjacent the base than at the outer end.

4. A propeller, having its blades pivotally mounted for free and independent swinging movement, each blade being curved outwardly at one side of the axis of said swinging movement from its base toward the lengthwise middle of the blade and thence inwardly toward said axis for the remaining length of the blade each blade having a wide portion adjacent its base and thence tapering to a narrow outer end.

5. A propeller, having its blades pivotally mounted for free independent swinging movement, said pivotal mounting being on an axis substantially at right angles to the axis of rotation of the propeller, each blade, when viewed edgewise having a lengthwise curve or bow approaching the line of the pivotal axis adjacent its opposite ends and curving away from said axis between said ends, the inner surface of the blade being substantially straight from front to rear edge, and presenting a blade with its center of pressure eccentric to its pivotal axis.

6. A propeller, having its blades pivotally mounted for free independent swinging movement, said pivotal mounting being on an axis substantially at right angles to the axis of rotation of the propeller, each blade, when viewed edgewise having a lengthwise curve or bow approaching the line of the pivotal axis adjacent its opposite ends and curving away from said axis between said ends, the inner surface of the blade being substantially straight from front to rear edge and the outer surface having an arched cutting edge and thence tapering to a thin trailing edge.

7. A propeller, having its blades pivotally mounted, each blade being curved longitudinally and tapered to an outer tip and laterally to a trailing edge, the inner surface being formed in substantially the same curved plane, and having its forward edge arched at the outer surface, said blade having provision whereby its center of pressure during rotation shifts from its normal center when at rest substantially in a straight line across the width of the blade steadily and evenly during changing angles of attack.

In testimony whereof, I have signed my name to this specification, in the presence of two subscribing witnesses.

FRANK W. STODDER.

Witnesses:
L. E. CAMPBELL,
F. M. ROBINSON.